US012659919B2

(12) United States Patent (10) Patent No.: US 12,659,919 B2
Henry et al. (45) Date of Patent: Jun. 16, 2026

(54) RECEIVER AND TRANSMITTER ASSISTANT METHOD FOR AMP

(71) Applicant: Cisco Technology, Inc., San Jose, CA (US)

(72) Inventors: Jerome Henry, Pittsboro, NC (US); Robert E. Barton, Richmond (CA); Indermeet S. Gandhi, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 332 days.

(21) Appl. No.: 18/468,835

(22) Filed: Sep. 18, 2023

(65) Prior Publication Data

US 2024/0381300 A1 Nov. 14, 2024

Related U.S. Application Data

(60) Provisional application No. 63/502,086, filed on May 13, 2023.

(51) Int. Cl.
*H04W 64/00* (2009.01)
*H04W 84/12* (2009.01)
*H04W 88/08* (2009.01)

(52) U.S. Cl.
CPC .......... *H04W 64/003* (2013.01); *H04W 84/12* (2013.01); *H04W 88/085* (2013.01)

(58) Field of Classification Search
CPC ......... H04W 52/0229; H04W 52/0216; H04W 52/028; H04W 72/0473; H04W 52/0235;
(Continued)

(56) References Cited

U.S. PATENT DOCUMENTS 10,848,239 B2 * 11/2020 Kim ......................... H04B 7/22
12,132,538 B2 * 10/2024 Patchava ............ H04B 7/06958
(Continued)

FOREIGN PATENT DOCUMENTS

CN 109547039 A 3/2019
CN 115835329 A 3/2023
(Continued)

OTHER PUBLICATIONS

Qi, Yinan et al. "Amp Devices in WLAN" IEEE 902.11-23/0388R1; Mar. 13, 2023; (23 pages).
(Continued)

*Primary Examiner* — Jung Liu
(74) *Attorney, Agent, or Firm* — Merchant & Gould P.C.

(57) ABSTRACT

Receiver and transmitter assistance for Backscatter Devices (BKDs) may be provided. Network devices enabled to assist with management of BKDs in a network may be identified. A relative position of each of network devices may be determined with respect to an Access Point (AP) it is associated with. A first group of network devices from the network devices may be determined to relay BKD frames based on the relative position of each of the network devices and positions of the BKDs. Each APs of the network with which the first group of network devices are associated with may be caused to send a BKD relay assistance request to each of the first group of network devices. The BKD relay assistance request may include a request to detect the BKD frames backscattered by the BKDs and to relay the detected BKD frames to the AP.

18 Claims, 5 Drawing Sheets

(58) Field of Classification Search
CPC ........... H04W 52/0245; H04W 72/543; H04W
74/0816; H04W 72/21; H04W 92/18;
H02J 50/40; H02J 50/80; H04B 7/22;
H04L 1/1887; H04L 1/1812; H04L
1/1861; H04L 2001/0092

See application file for complete search history.

(56)             References Cited

U.S. PATENT DOCUMENTS

| | | | |
|---|---|---|---|
| 2015/0195032 A1* | 7/2015 | Sharma | H04B 7/15592 |
| | | | 370/315 |
| 2020/0204251 A1* | 6/2020 | Kim | H04W 72/23 |
| 2021/0084251 A1* | 3/2021 | Gollakota | H04N 5/40 |
| 2023/0006791 A1* | 1/2023 | Yang | H04B 7/04013 |
| 2023/0189269 A1* | 6/2023 | Wang | H04W 72/12 |
| | | | 370/329 |
| 2023/0327709 A1* | 10/2023 | Wang | H04W 60/04 |
| | | | 455/41.1 |
| 2023/0378807 A1* | 11/2023 | Wang | H04W 72/1263 |
| 2024/0106532 A1* | 3/2024 | Mahalingam | H04W 52/0229 |
| 2024/0151815 A1* | 5/2024 | Wang | G01S 7/4865 |
| 2024/0204905 A1* | 6/2024 | Barbu | H04K 3/825 |
| 2024/0255634 A1* | 8/2024 | Wang | G01S 13/75 |
| 2024/0258833 A1* | 8/2024 | Sun | H02J 50/20 |
| 2024/0296305 A1* | 9/2024 | Miller | G06K 7/10158 |
| 2024/0340706 A1* | 10/2024 | Huang | H04B 7/15528 |

| | | | |
|---|---|---|---|
| 2025/0220419 A1* | 7/2025 | Elshafie | H04W 12/03 |
| 2025/0220579 A1* | 7/2025 | Cheng | H04L 67/12 |
| 2025/0247170 A1* | 7/2025 | Elshafie | H04W 72/21 |
| 2025/0280379 A1* | 9/2025 | Wu | H04W 56/0045 |
| 2025/0300725 A1* | 9/2025 | Elshafie | H04B 5/79 |
| 2025/0301487 A1* | 9/2025 | Wu | H04W 72/30 |
| 2025/0307575 A1* | 10/2025 | Elshafie | G06K 7/10009 |

FOREIGN PATENT DOCUMENTS

| | | |
|---|---|---|
| KR | 102090760 B1 | 3/2020 |
| WO | 2024109152 A1 | 5/2024 |

OTHER PUBLICATIONS

Munir, Daniyal et al. "Relay Selection Scheme for Cooperative Backscatter Communications Networks"; Springerlink, Jul. 4, 2018 (12 pages).

International Search Report and Written Opinion for International Application No. PCT/US2024/028995, mailed Sep. 13, 2024, 19 Pages.

Munir D., et al., "Cooperative Relay Strategy for Backscatter Communication Networks with RF Energy Harvesting", Physical Communication, Elsevier, Amsterdam, NL, vol. 37, Sep. 24, 2019, 8 Pages, XP085928300, ISSN: 1874-4907, DOI: 10.1016/J.PHYCOM. 2019.100861, [Retrieved on Sep. 24, 2019] p. 2, col. 2, Line 2 Section 3, p. 4 p. 4, col. 1 Section 2, p. 2, col. 2.

\* cited by examiner

RECEIVER AND TRANSMITTER ASSISTANT METHOD FOR AMP

RELATED APPLICATION

Under provisions of 35 U.S.C. § 119 (e), Applicant claims the benefit of U.S. Provisional Application No. 63/502,086, filed May 13, 2023, which is incorporated herein by reference.

TECHNICAL FIELD

The present disclosure relates generally to providing receiver and transmitter assistance for Backscatter Devices (BKDs).

BACKGROUND

In computer networking, a wireless Access Point (AP) is a networking hardware device that allows a Wi-Fi compatible client device to connect to a wired network and to other client devices. The AP usually connects to a router (directly or indirectly via a wired network) as a standalone device, but it can also be an integral component of the router itself. Several APs may also work in coordination, either through direct wired or wireless connections, or through a central system, commonly called a Wireless Local Area Network (WLAN) controller. An AP is differentiated from a hotspot, which is the physical location where Wi-Fi access to a WLAN is available.

Prior to wireless networks, setting up a computer network in a business, home, or school often required running many cables through walls and ceilings in order to deliver network access to all of the network-enabled devices in the building. With the creation of the wireless AP, network users are able to add devices that access the network with few or no cables. An AP connects to a wired network, then provides radio frequency links for other radio devices to reach that wired network. Most APs support the connection of multiple wireless devices. APs are built to support a standard for sending and receiving data using these radio frequencies.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Figure 1:
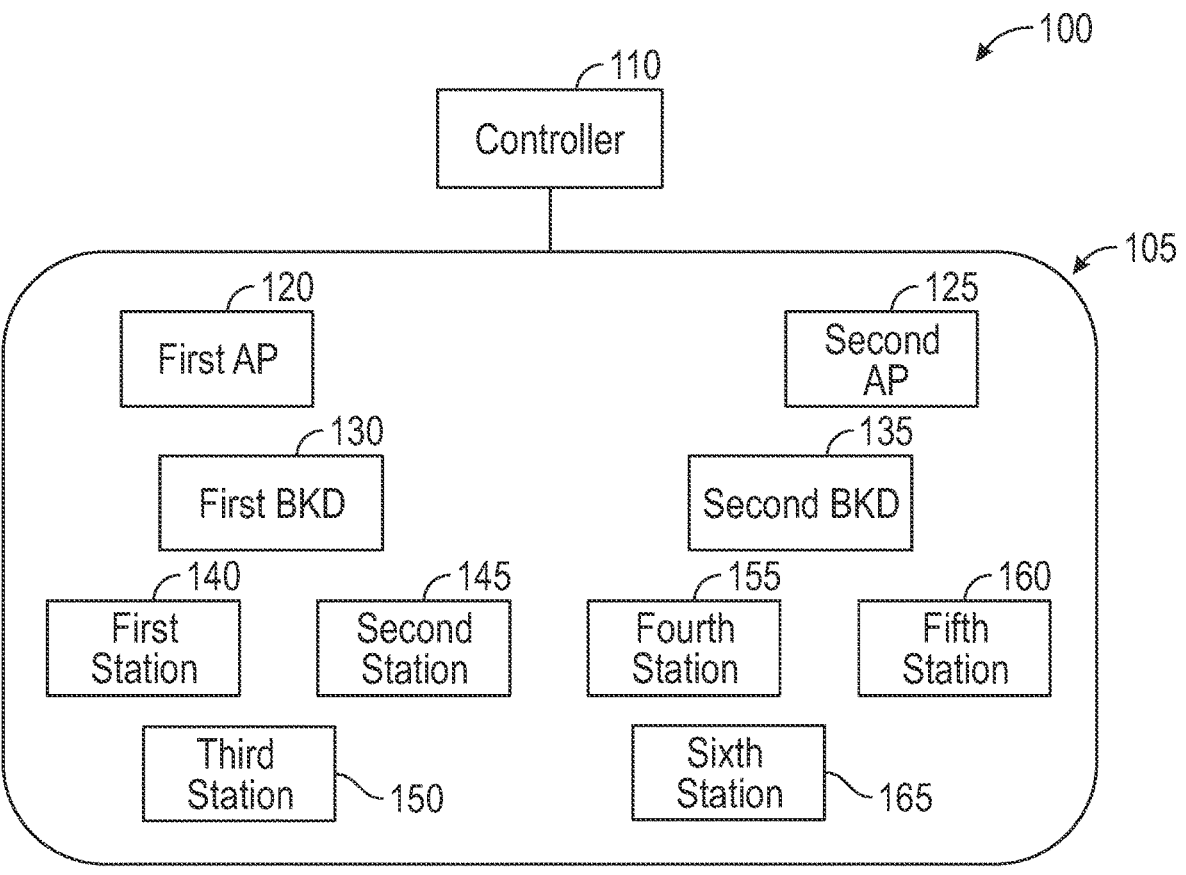
FIG. 1 is a block diagram of an operating environment for receiver and transmitter assistance for Backscatter Devices (BKDs)

Receiver and transmitter assistance for Backscatter Devices (BKDs) may be provided. A plurality of network devices enabled to assist with management of BKDs in a network may be identified. A relative position of each of the plurality of network devices may be determined with respect to an Access Point (AP) it is associated with. A first group of network devices from the plurality of network devices may be determined to relay BKD frames based on the relative position of each of the plurality of network devices and positions of the BKDs. Each APs of the network with which the first group of network devices are associated with may be caused to send a BKD relay assistance request to each of the first group of network devices. The BKD relay assistance request may include a request to detect the BKD frames backscattered by the BKDs and to relay the detected BKD frames to the AP.

Both the foregoing overview and the following example embodiments are examples and explanatory only and should not be considered to restrict the disclosure's scope, as described, and claimed. Furthermore, features and/or variations may be provided in addition to those described. For example, embodiments of the disclosure may be directed to various feature combinations and sub-combinations described in the example embodiments.

EXAMPLE EMBODIMENTS

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

Ambient Power (AMP) Backscatter Devices (BKDs) may use ambient energy, for example, Radio Frequency (RF) signals to transmit data without a power source such as a battery or a connection to electricity. BKDs may use an antenna to receive the RF signals, use the RF signals for excitation (e.g., convert the RF signal into electricity), and use the power to modify and reflect the RF signals with data. Other devices may receive reflected RF signals transmitted by a BKD to oricess the data the BKD is sending. BKD operations may be described in documents and standards from the Institute of Electrical and Electronics Engineers (IEEE). For example, the IEEE AMP topic interest group and the IEEE 802.11 standard may describe the operations of BKDs.

There may be two types of BKDs: passive BKDs (pBKDs) and active BKDs (pBKDs). A pBKD may directly reflect back the energy it receives. An aBKD may include a capacitor and may thus charge until it sends its own frame. As discussed above, BKDs may be powered by ambient energy (for example, RF signals) present in the surrounding environment. It may be a challenge to collect information backscattered by the BKDs. Wireless Fidelity (WiFi) may not be full duplex. So, a network device transmitting the RF signals that actives the BKDs may not be able to detect BKD response while transmitting. Moreover, an amount of energy transmitted over WiFi may be limited by regulations that may limit achievable range for the BKD response. The disclosure may, therefore, provide processes for receiver and transmitter assistance for BKDs in a network.

FIG. 1 is a block diagram of an operating environment 100 for receiver and transmitter assistance for BKDs. Operating environment 100 may include a network 105 and a controller 110. Network 105 may include a plurality of network devices, for example, a plurality of Access Points (APs) (that is, a first AP 120 and a second AP 125), a plurality of BKDs (that is, a first BKD 130 and a second BKD 135), and a plurality of stations (that is, a first station 140, a second station 145, a third station 150, a fourth station 155, a fifth station 160, and a sixth station 165). Network 105 may comprise, but is not limited to, a Wireless Local Area Network (WLAN). Network 105 may also be referred to as a coverage environment.

Controller 110 may be a WLAN controller (WLC) and may provision and control network 105. Controller 110 may be implemented by a Digital Network Architecture Center (DNAC) controller (i.e., a Software-Defined Network (SDN) controller). Controller 110, first AP 120, and second AP 125 may provide a WLAN. Through this WLAN, first BKD 130, second BKD 135, first station 140, second station 145, third station 150, fourth station 155, fifth station 160, and sixth station 165 may be provided with access to the Internet or other cloud-based networking environments.

Each first AP 120 and second AP 125 may be compatible with specification standards such as, but not limited to, the Institute of Electrical and Electronics Engineers (IEEE) 802.11 specification standard for example. First AP 120 and second AP 125 may communicate with each other to conduct operations in concert. In addition, first AP 120 and second AP 125 may be devices that can send and receive signals to provide a connection to network 105.

First BKD 130 and second BKD 135 may be devices that may utilize RF signals first AP 120, second AP 125, first station 140, second station 145, third station 150, fourth station 155, fifth station 160, and sixth station 165, and/or other devices transmit to generate power, modulate or otherwise modify the received signals to encode data, and reflect the modulated signals. First BKD 130 and second BKD 135 may be user devices, Internet-of-Things (IoT) devices, sensors, and/or the like. Each of first BKD 130 and second BKD 135 may be a pBKD or an aBKD.

First station 140, second station 145, third station 150, fourth station 155, fifth station 160, and sixth station 165 may communicate with first AP 120 and second AP 125, first BKD 130, and second BKD 135. First station 140, second station 145, third station 150, fourth station 155, fifth station 160, and sixth station 165 may be devices with a constant power source, for example, a battery or connected to electrical power. First station 140, second station 145, third station 150, fourth station 155, fifth station 160, and sixth station 165 may be, for example, a smart phone, a personal computer, a tablet device, a mobile device, a telephone, a remote control device, a set-top box, a digital video recorder, an IoT device, a network computer, a sensor, a router, an Automated Transfer Vehicle (ATV), a drone, an Unmanned Aerial Vehicle (UAV), or other similar microcomputer-based device.

The elements described above of operating environment 100 (e.g., controller 110, first AP 120, second AP 125, first BKD 130, second BKD 135, first station 140, second station 145, third station 150, fourth station 155, fifth station 160, and sixth station 165) may be practiced in hardware and/or in software (including firmware, resident software, microcode, etc.) or in any other circuits or systems. The elements of operating environment 100 may be practiced in electrical circuits comprising discrete electronic elements, packaged or integrated electronic chips containing logic gates, a circuit utilizing a microprocessor, or on a single chip containing electronic elements or microprocessors. Furthermore, the elements of operating environment 100 may also be practiced using other technologies capable of performing logical operations such as, for example, AND, OR, and NOT, including but not limited to, mechanical, optical, fluidic, and quantum technologies. As described in greater detail below with respect to FIG. 5, the elements of operating environment 100 may be practiced in a computing device 500.

Figure 2:
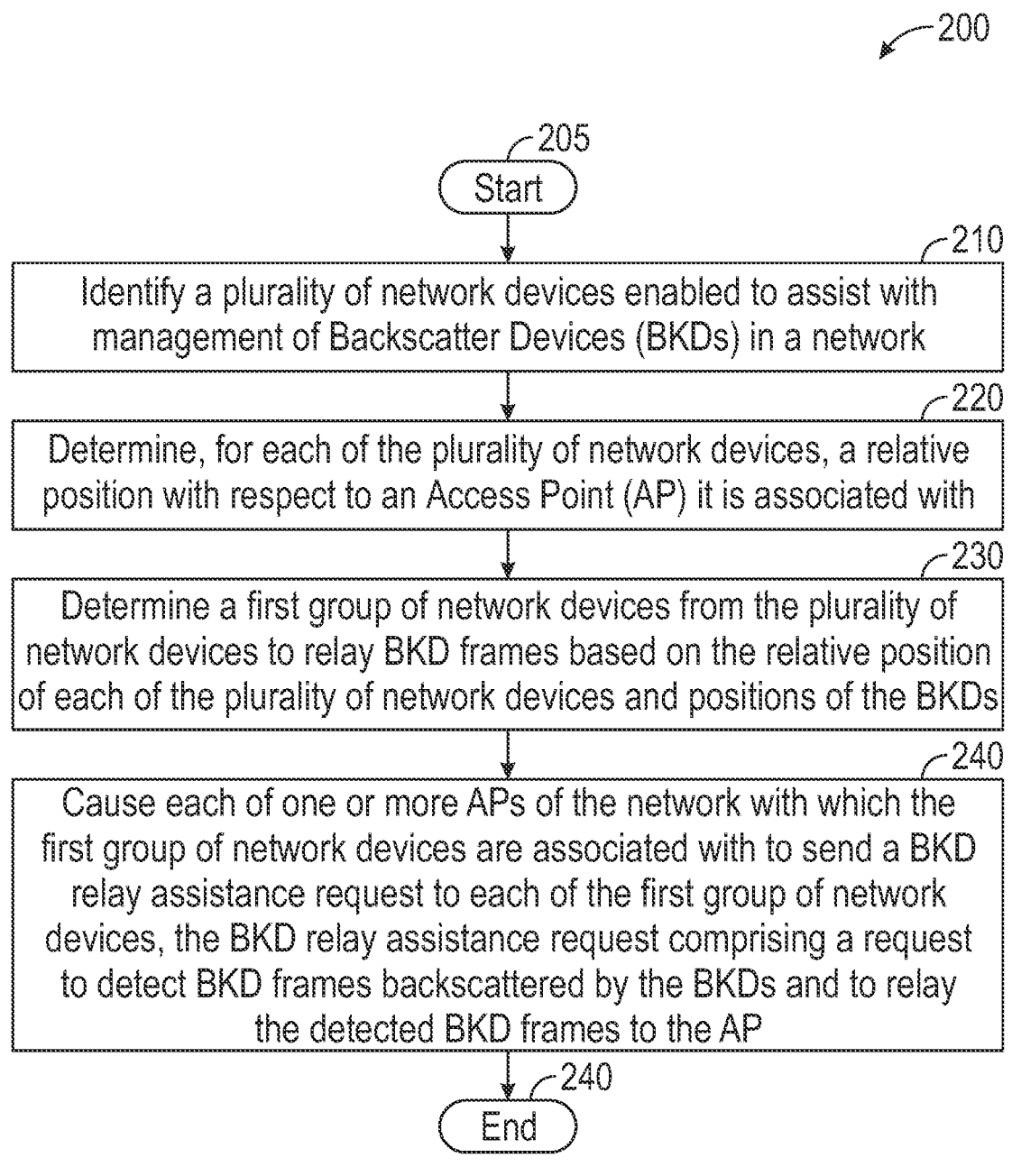
FIG. 2 is a flow chart of a first method for receiver and transmitter assistance for BKDs.

FIG. 2 is a flow chart setting forth the general stages involved in a first method 200 consistent with embodiments of the disclosure for receiver and transmitter assistance for BKDs. Method 200 may be implemented using controller 110 as described in more detail above with respect to FIG. 1. However, method 200 may be implemented using any of first AP 120, second AP 125, first station 140, second station 145, third station 150, fourth station 155, fifth station 160, and sixth station 165 as described in more detail above with respect to FIG. 1. Ways to implement the stages of method 200 will be described in greater detail below.

Method 200 may begin at starting block 205 and proceed to stage 210 where controller 110 may identify a plurality of network devices that may be enabled to assist with management of BKDs in network 105. The network devices with a constant power source, for example, first AP 120, second AP 125, first station 140, second station 145, third station 150, fourth station 155, fifth station 160, and sixth station 165 that are associated with network 105 may express a BKD assistance capability. The BKD assistance capability may be expressed in a capability field allowing them to accept an assistance request from other devices in network 105. Controller 110 may create a list of such network devices of network 105 that are able to assist with management of BKDs. All APs of network 105 (that is, first AP 120 and second AP 125) may be expected to be able to assist with the management of BKDs by default. Controller 110 may record an identifier (for example, a Media Access Control (MAC) address) of each non-AP devices that may be able to assist with the management of BKDs.

After identifying the plurality of network devices that may be enabled to assist with the management of BKDs in network 105 at stage 210, method 200 may proceed to stage 220 where controller 110 may determine a relative position for each of the plurality of network devices with respect to an AP it is associated with. The relative position may include a Received Signal Strength Indicator (RSSI) to an AP a network device is associated with and a RSSI to neighboring APs. The RSSIs may be determined from IEEE 802.11k beacon reports. For example, first station 140, second station 145 and third station 150 may be associated with first AP 120 while fourth station 155, fifth station 160, and sixth station 165 may be associated with second AP 125. Controller 110 may determine the RSSI for each of first station 140, second station 145 and third station 150 to first AP 120 and for each of fourth station 155, fifth station 160, and sixth station 165 to second AP 125. In addition, first AP 120 may be a neighbor AP to fourth station 155, fifth station 160, and sixth station 165. Thus controller 110, may determine the RSSI for each of fourth station 155, fifth station 160, and sixth station 165 to first AP 120. Moreover, second AP 125 may be a neighbor AP to first station 140, second station 145 and third station 150. Thus controller 110, may determine the RSSI for each of first station 140, second station 145 and third station 150 to second AP 125.

Once having determined the relative position of each of the plurality of network devices with respect to the AP it is associated with at stage 220, method 200 may proceed to stage 230 where controller 110 may determine a first group of network devices from the plurality of network devices to relay BKD frames based on the relative position of each of the plurality of network devices and positions of the BKDs. Controller 110 may make an inventory of BKDs, for example, first BKD 130 and second BKD 135 of network 105. Controller 110 may also determine a relative position of each BKDs of network 105 with respect to the plurality of network devices, for example, first AP 120, second AP 125, first station 140, second station 145, third station 150, fourth station 155, fifth station 160, and sixth station 165. Based on the relative positions of the BKDs and the plurality of network devices, controller 110 may determine the first group of network devices from the plurality of network devices to relay BKD frames. The first group of network devices may each have a RSSI greater than a predetermined value. For example, controller 110 may determine that first station 140 and second station 145 to relay BKD frames from first BKD 130, as first station 140 and second station 145 are relatively closer to first BKD 130 and are associated with first AP 120. In another example, controller 110 may determine fourth station 155 and fifth station 160 to relay BKD frames from second BKD 135.

After determining the first group of network devices from the plurality of network devices to relay the BKD frames at stage 230, method 200 may proceed to stage 240 where controller 110 may cause each of one or more APs of the network with which the first group of network devices are associated with to send a BKD relay assistance request to each of the first group of network devices. The BKD relay assistance request may comprise a request to detect the BKD frames backscattered by the BKDs and to relay the detected BKD frames to the AP. For example, controller 110 may cause first AP 120 to send the BKD relay assistance request to each of first station 140 and second station 145 to detect the BKD frames backscattered by first BKD 130 and send the detected BKD frames to first AP 120. Similarly, controller 110 may cause second AP 125 to send the BKD relay assistance request to each of fourth station 155 and fifth station 160 to detect the BKD frames backscattered by second BKD 135 and relay the detected BKD frames to second AP 125.

The BKD relay assistance request may be an action frame. The BKD relay assistance request may include a target detection channel on which the BKD frames may be expected and a target relay channel on which the detected BKD frames may be relayed by detecting stations to associated APs. The target detection channel and the target relay channel may be different, thus allowing a relaying device to detect the BKD frames in sub-1 GHz or 2.4 GHz and relay the BKD frames in 5 GHz. Once causing each of one or more APs of network 105 with which the first group of network devices are associated with to send the BKD relay assistance request to each of the first group of network devices at stage 240, method 200 may terminate at end block 250.

Figure 3:
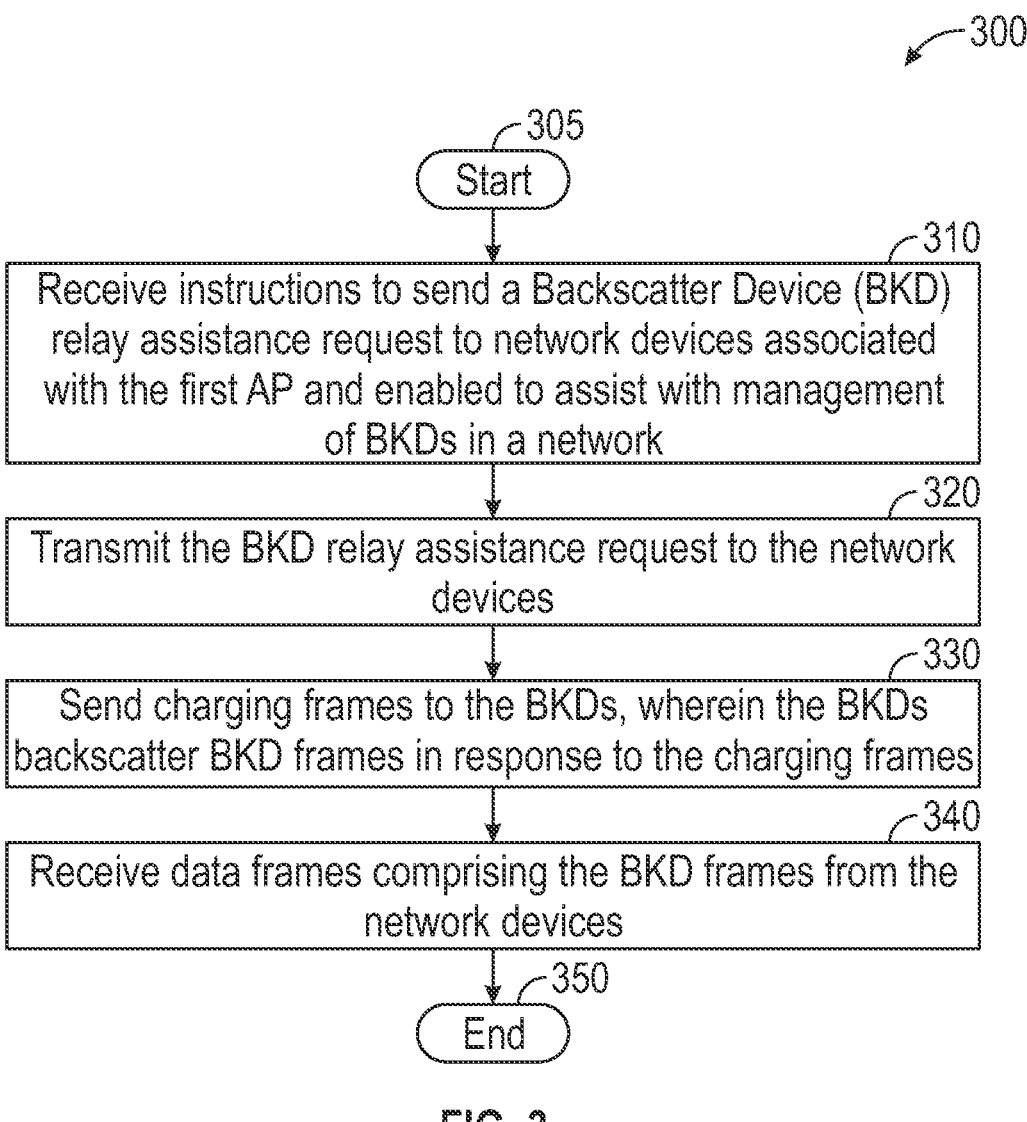
FIG. 3 is a flow chart of a second method for receiver and transmitter assistance for BKDs.

FIG. 3 is a flow chart setting forth the general stages involved in a second method 300 consistent with embodiments of the disclosure for receiver and transmitter assistance for BKDs. Method 300 may be implemented using first AP 120 as described in more detail above with respect to FIG. 1. However, method 300 may be implemented using any of controller 110, second AP 125, first station 140, second station 145, third station 150, fourth station 155, fifth station 160, and sixth station 165 as described in more detail above with respect to FIG. 1. Ways to implement the stages of method 300 will be described in greater detail below.

Method 300 may begin at starting block 305 and proceed to stage 310 where first AP 120 may receive instructions to send a BKD relay assistance request to network devices associated with first AP 120 and enabled to assist with management of BKDs in network 105. For example, first AP 120 may receive instructions to send the BKD relay assistance request to one or more of first station 140, second station 145, and third station 150 that are associated with first AP 120 that may be enabled to assist with management of BKDs in network 105. First AP 120 may receive the instructions from controller 110 as a trigger frame.

After receiving the instructions to instructions to send the BKD relay assistance request at stage 310, method 300 may proceed to stage 320 where first AP 120 may transmit the BKD relay assistance request to the network devices. For example, first AP 120 may send the BKD relay assistance request to first station 140, second station 145, and third station 150. The BKD relay assistance request may include a target detection channel on which the BKD frames may be expected and a target relay channel on which the detected BKD frames may be relayed by first station 140, second station 145, and third station 150 to first AP 120.

Once having sent the BKD relay assistance request at stage 320, method 300 may proceed to stage 330 where first AP 120 may send charging frames to the BKDs. For example, first AP 120 may send the charging frames in network 105 that may be used by first BKD 130 and second BKD 135. The charging frames may be sent over the target detection channel. First BKD 130 and second BKD 135 may backscatter BKD frames in response to the charging frames. pBKDs may backscatter in real time while a-BKDs may respond after charging a capacitor.

After sending the charging frames at stage 330, method 300 may proceed to stage 340 where first AP 120 may receive data frames comprising BKD frames from the network devices. As discussed in the following sections of the disclosure, first station 140, for example, may detect the BKD frames backscattered by first BKD 130 and second BKD 135 and relay the detected BKD frames in data frames to first AP 120. The data frames containing the BKD frames may be received on the target relay channel. Once having received the data frames comprising the BKD frames at stage 340, method 300 may terminate at stage 350.

Figure 4:
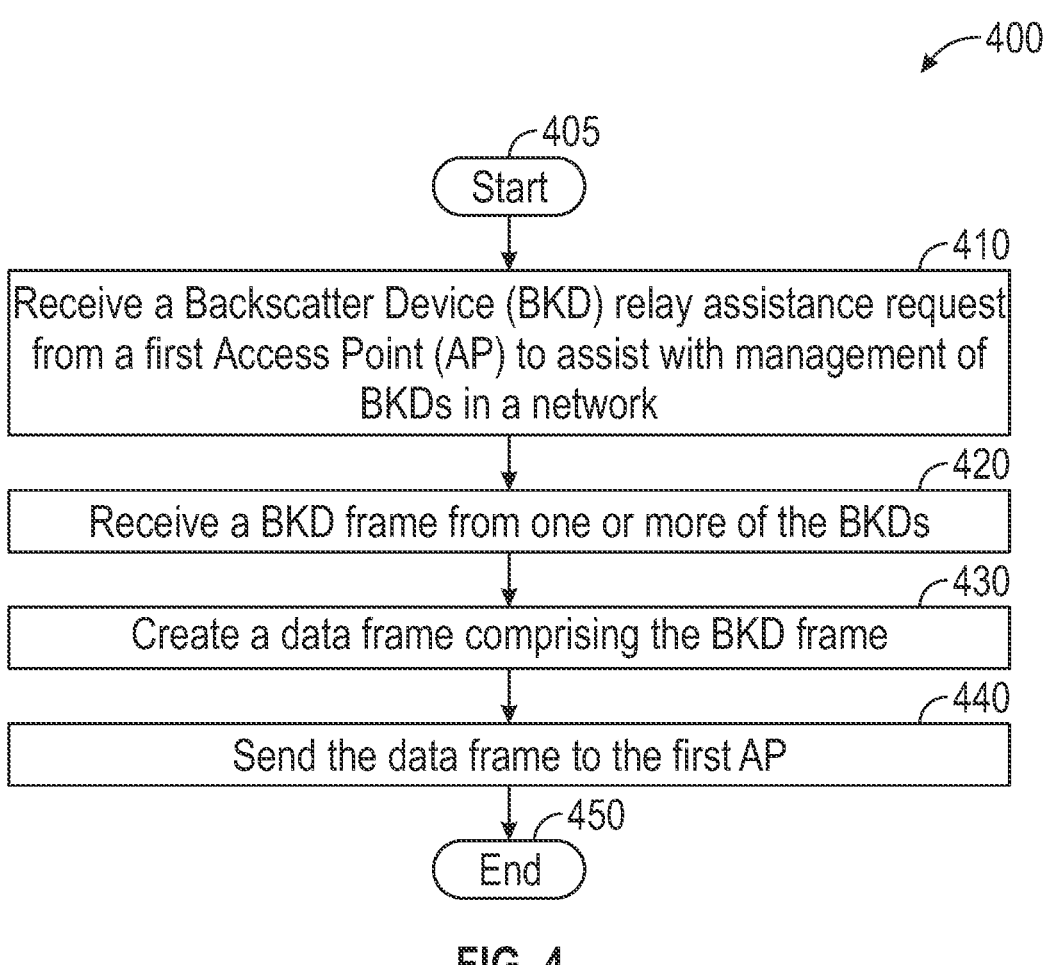
FIG. 4 is a flow chart of a third method for receiver and transmitter assistance for BKDs.

FIG. 4 is a flow chart setting forth the general stages involved in a third method 400 consistent with embodiments of the disclosure for receiver and transmitter assistance for BKDs. Method 400 may be implemented using first station 140 as described in more detail above with respect to FIG. 1. However, method 400 may be implemented using any of controller 110, first AP 120, second AP 125, second station 145, third station 150, fourth station 155, fifth station 160, and sixth station 165 as described in more detail above with respect to FIG. 1. Ways to implement the stages of method 400 will be described in greater detail below.

Method 400 may begin at starting block 405 and proceed to stage 410 where first station 140 may receive a BKD relay assistance request from first AP 120 to assist with management of BKDs in network 105. First AP 120 may transmit the BKD relay assistance request to first station 140 in response to an instruction or a trigger received from controller 110. The BKD relay assistance request may include a target detection channel on which the BKD frames may be expected and a target relay channel on which the detected BKD frames may be relayed by first station 140 to first AP 120.

After receiving the BKD relay assistance request from first AP 120 at stage 410, method 400 may proceed to stage 420 where first station 140 may receive a BKD frame from one or more of the BKDs. For example, after sending the BKD relay assistance request, first AP 120 may transmit charging frames. First BKD 130 and second BKD 135 may backscatter BKD frames in response to the charging frames. The BKD frames may include a sensor data when BKDs have a sensor associated with it. The BKD frames may be received by first station 140 on the target detection channel.

Once having received the BKD frame at stage 420, method 400 may proceed to stage 430 where first station 140 may create a data frame comprising the BKD frame. First station 140, for example, may detect the BKD frame backscattered by first BKD 130 or second BKD 135 and may demodulate the detected BKD frame. First station 140 may insert the demodulate BKD frame into a data frame.

After creating the data frame at stage 430, method 400 may proceed to stage 440 where first station 140 may send the data frame to first AP 120. First station 140 may send the data frame on the target relay channel. First station 140 may send the data frame that may include the demodulated BKD frame over the target relay channel using IEEE 802.11 mechanisms. In examples, the data frame may have a predetermined format indicating that it may contain a BKD frame. In such examples, the data frame may be of a non-data type, for example, a management frame or an action frame. Once having sent the data frame to first AP 120, method 400 may terminate at end block 450.

In some examples, the BKD frame may be encrypted or protected. First station 140 may demodulate the BKD frame but may not process it. In a case where first station 140 is a Multi-Link Device (MLD), first AP 120 or controller 110 may provide a link recommendation to first station 140 and a Traffic Identifier (TID) to use for sending the data frame comprising the BKD frame.

In some examples, first STA 140 may not be able to demodulate the BKD frame. In such examples, first STA 140 may use an IEEE 802.11 channel access mechanisms to replay the BKD frame. Replaying the BKD frame may increase a strength of the BKD frame signal so it may be received by first AP 120 or another network device of network 105. First AP 120 or controller 110 may then receive and demodulate the replayed BKD frame.

A data frame comprising a BKD frame and a relayed BKD frame may each indicate a signal level (for example, a RSSI value) at which first station 140 detected the BKD frame. The signal level may be indicated in an Information Element (IE) in a header of the data frame. The IE may also include other operational parameters, for example, a number of BKD frames that were detected, and if any collision between BKD transmissions was detected (preventing demodulation).

First AP 120 or controller 110 may use information gathered from the IE of the data frames comprising the BKD frames and the relayed BKD frames to change a structure of subsequent charging frames. For example, a power or a duration of the subsequent charging frames may be adjusted based on the RSSI value of the BKD frames and the number of detected BKD frames at first station 140. First AP 120 or controller 110 may also use the information gathered from the IE of the data frames comprising the BKD frames to determine a second subset of network devices or stations to assist with management of the BKDs. For example, first AP 120 or controller 110 may determine a subset of network devices from the first group of network devices (for example, first station 140 and second station 145 of first station 140, second station 145, and third station 150) to send the BKD relay assistance request based on the received signal level. The subset of network devices may be determined based on the signal level and the number of detected BKD frames. For example, controller 110 or first AP 120 may determine a smaller number of stations having a certain level of the signal level and the number of detected BKD frames to send or relay detected BKD frames. Other stations then may be used in assisting with charging frames.

In accordance with example embodiments, one or more stations of network 105 may be used to transmit charging frames and thus may be used as charging sources. Target stations to assist with transmitting the charging frames may be determined based on locations of the plurality of stations and the locations of the plurality of BKDs in network 105. The target stations may also be determined based on the information gathered from the IE (for example, the RSSI) of the data frames comprising the BKD frames and relayed the BKD frames. In some examples, the target stations may be determined as they may express their BKD charging assistance capability in capability fields.

First AP 120 or second AP 125 may send a BKD charging assistance request to the target stations. The BKD charging assistance request may include characteristics of the charging frames to be transmitted by the target stations. The characteristics may include a structure, a duration, and a number of frames. The BKD charging assistance request may be sent individually or in a group. Each target station may respond with an accept or decline if the request is sent to a group. When sent individually, each target station may accept, decline, or propose for a different scheme. The proposal for the different scheme may include a proposed structure, a proposed duration, and a proposed number of frames. Controller 110, first AP 120, or second AP 125 may determine a second group of network devices or stations from the target stations to transmit the charging frames for the BKDs based on these responses.

First AP 120 or second AP 125 then may send a trigger frame to trigger the second group of network devices to start transmitting the charging frames. Thus, processes disclosed herein may identify a first group of network devices to send the BKD frames and a second group of network devices to transmit the charging frames throughout network 105.

In some examples, controller 110 may determine that a station, for example, second station 145 associated with first AP 120 may also be in a position to assist second AP 125 in management of the BKDs. In such examples, controller 110 may instruct second station 145 to associate itself with second AP 125. In addition, second station 145 may return its messages to second AP 125 which then may relay it to first AP 120. When second station 145 is in range of both first AP 120 and second AP 125, second AP 125 may request to first AP 120 channel to assist. Second station 145 then may establish a secure link to first AP 120 and may send the BKD frames.

Figure 5:
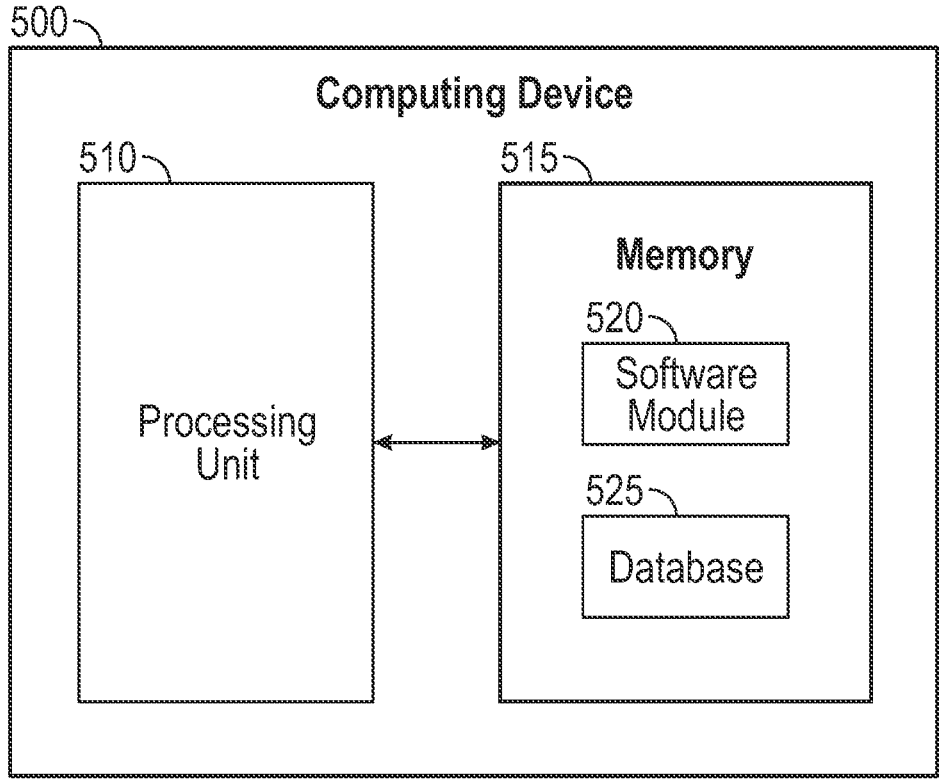
FIG. 5 is a block diagram of a computing device.

FIG. 5 is a block diagram of a computing device 500. As shown in FIG. 5, computing device 500 may include a processing unit 510 and a memory unit 515. Memory unit 515 may include a software module 520 and a database 525. While executing on processing unit 510, software module 520 may perform, for example, processes for receiver and transmitter assistance for BKDs described with respect to FIG. 2, FIG. 3, and FIG. 4. Computing device 500, for example, may provide an operating environment for controller 110, first AP 120, second AP 125, first BKD 130, second BKD 135, first station 140, second station 145, third station 150, fourth station 155, fifth station 160, and sixth station 165, and the like. Controller 110, first AP 120, second AP 125, first BKD 130, second BKD 135, first station 140, second station 145, third station 150, fourth station 155, fifth station 160, and sixth station 165, and the like may operate in other environments and are not limited to computing device 500.

Computing device 500 may be implemented using an AP, a tablet device, a mobile device, a smart phone, a telephone, a remote control device, a set-top box, a digital video recorder, a cable modem, a personal computer, a network computer, a mainframe, a router, a switch, a server cluster, a smart TV-like device, a network storage device, a network relay device, or other similar microcomputer-based device. Computing device 500 may comprise any computer operating environment, such as hand-held devices, multiprocessor systems, microprocessor-based or programmable sender electronic devices, minicomputers, mainframe computers, and the like. Computing device 500 may also be practiced in distributed computing environments where tasks are performed by remote processing devices. The aforementioned systems and devices are examples, and computing device 500 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on, or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to, mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the element illustrated in FIG. 1 may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the disclosure, may be performed via application-specific logic integrated with other components of computing device 500 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

The invention claimed is:

1. A method comprising:

identifying a plurality of network devices enabled to assist with management of Backscatter Devices (BKDs) in a network;

determining, for each of the plurality of network devices, a relative position with respect to an Access Point (AP) it is associated with;

determining a first group of network devices from the plurality of network devices to relay BKD frames based on the relative position of each of the plurality of network devices and positions of the BKDs;

causing each of one or more APs of the network with which the first group of network devices are associated with to send a BKD relay assistance request to each of the first group of network devices, the BKD relay assistance request comprising a request to detect the BKD frames backscattered by the BKDs and to relay the detected BKD frames to the AP;

receiving data frames comprising the BKD frames from the first group of network devices;

receiving a signal level at which each of the BKD frames were received by the first group of network devices; and determining a subset of network devices from the first group of network devices to send the BKD relay assistance request based on the received signal level.

2. The method of claim 1, wherein the relay assistance request comprises:

a target detection channel on which the BKD frames are expected from the BKDs; and a target relay channel on which to relay the detected BKD frames.

3. The method of claim 1, further comprising:

determining a second group of network devices from the plurality of network devices to transmit charging frames for the BKDs; and causing the second group of network devices to transmit the charging frames.

4. The method of claim 3, wherein causing the second group of network devices to transmit the charging frames further comprises:

sending characteristics of the charging frames to the second group of network devices, the characteristics comprising a structure, a duration, and a number of frames.

5. The method of claim 3, wherein causing the second group of network devices to transmit the charging frames further comprises:

causing sending a trigger frame to the second group of network devices, the trigger frame causing the second group of network devices to transmit the charging frames.

6. The method of claim 1, further comprising:

causing a network device to change its association from a first AP to a second AP to assist with management of the BKDs.

7. A method comprising:

receiving, by a first Access Point (AP), instructions to send a Backscatter Device (BKD) relay assistance request to network devices associated with the first AP and enabled to assist with management of BKDs in a network;

transmitting, by the first AP, the BKD relay assistance request to the network devices;

sending, by the first AP, charging frames to the BKDs, wherein the BKDs transmit BKD frames in response to the charging frames;

receiving, by the first AP, data frames comprising the BKD frames from the network devices;

transmitting, by the first AP, a BKD charging assistance request to transmit charging frames to at least two network devices associated with the first AP; and transmitting characteristics of the charging frames, the characteristics comprising a structure, a duration, and a number of frames.

8. The method of claim 7, further comprising:

receiving a signal level at which each of the BKD frames were received by the network devices; and changing a structure of the charging frames based on received signal levels at which the BKD frames were received.

9. The method of claim 7, further comprising:

receiving an acceptance to the BKD charging assistance request to transmit the charging frames from a first network device of the at least two network devices; and receiving a proposal for different characteristics from a second network device of the at least two network devices.

10. The method of claim 7, further comprising:

transmitting a trigger frame to the at least two network devices, the trigger frame triggering transmission of the charging frames by the at least two network devices.

11. The system of claim 10, wherein the processing unit is further operative to:

receive an acceptance to the BKD charging assistance request to transmit the charging frames from a first network device of the at least two network devices; and receive a proposal for different characteristics from a second network device of the at least two network devices.

12. The method of claim 7, further comprising:

forming a first group of network devices for relaying the BKD frames; and forming a second group of network devices for transmitting the charging frames.

13. The method of claim 7, wherein transmitting the BKD relay assistance request comprises transmitting the BKD relay assistance request comprising:

a target detection channel on which the BKD frames are expected from the BKDs; and a target relay channel on which to send the detected BKD frames.

14. A system comprising:

a memory storage; and a processing unit disposed in a first Access Point (AP) and coupled to the memory storage, wherein the processing unit is operative to:

receive instructions to send a Backscatter Device (BKD) relay assistance request to network devices associated with the first AP and enabled to assist with management of BKDs in a network;

transmit the BKD relay assistance request to the network devices;

send charging frames to the BKDs, wherein the BKDs transmit BKD frames in response to the charging frames;

receive data frames comprising the BKD frames from the network devices;

transmit a BKD charging assistance request to transmit charging frames to at least two network devices associated with the first AP; and transmit characteristics of the charging frames, the characteristics comprising a structure, a duration, and a number of frames.

15. The system of claim 14, wherein the processing unit is further operative to:

receive a signal level at which each of the BKD frames were received by the network devices; and change a structure of the charging frames based on received signal levels at which the BKD frames were received.

16. The system of claim 14, wherein the processing unit is further operative to transmit a trigger frame to the at least two network devices, the trigger frame triggering transmission of the charging frames by the at least two network devices.

17. The system of claim 14, wherein the processing unit is further operative to:

form a first group of network devices for relaying the BKD frames; and form a second group of network devices for transmitting the charging frames.

18. The system of claim 14, wherein the processing unit being operative to transmit the BKD relay assistance request comprises the processing unit being operative to transmit the BKD relay assistance request comprising:

a target detection channel on which the BKD frames are expected from the BKDs; and a target relay channel on which to send the detected BKD frames.

\*    \*    \*    \*    \*